(12) United States Patent
Baaij et al.

(10) Patent No.: US 12,722,238 B2
(45) Date of Patent: Sep. 1, 2026

(54) DOCKING STATION FOR A WORKPIECE HOLDER IN A DRIVERLESS TRANSPORT SYSTEM

(71) Applicant: TRUMPF Werkzeugmaschinen SE + Co. KG, Ditzingen (DE)

(72) Inventors: Ferdinand Baaij, Ditzingen (DE); Peter Epperlein, Leonberg (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 396 days.

(21) Appl. No.: 18/463,410

(22) Filed: Sep. 8, 2023

(65) Prior Publication Data

US 2023/0415288 A1 Dec. 28, 2023

Related U.S. Application Data

(63) Continuation of application No. PCT/EP2022/056605, filed on Mar. 15, 2022.

(30) Foreign Application Priority Data

Mar. 19, 2021 (DE) ..................... 10 2021 202 682.6

(51) Int. Cl.
*B23Q 7/14* (2006.01)

(52) U.S. Cl.
CPC .................................. *B23Q 7/1436* (2013.01)

(58) Field of Classification Search
CPC ........ B23Q 7/1436; G05B 2219/31372; G05B 2219/32046; G05B 19/41895
See application file for complete search history.

(56) References Cited

U.S. PATENT DOCUMENTS 3,909,922 A 10/1975 Takasaki et al.
5,699,242 A 12/1997 Togawa et al.
2008/0274865 A1 11/2008 Sturm
2009/0276082 A1 11/2009 Murata
(Continued)

FOREIGN PATENT DOCUMENTS

CN 108089557 A 5/2018
CN 110245731 A 9/2019
(Continued)

OTHER PUBLICATIONS

GOPAL The complete solution for safe and simple automation, Robotize, XP055929083, Mar. 3, 2021, https://www.robotize.com/media/ynwhiwdh/english-brochure-pdf-update-03-03-2021.pdf.

*Primary Examiner* — Sarang Afzali
*Assistant Examiner* — Darrell C Ford
(74) *Attorney, Agent, or Firm* — LEYDIG, VOIT & MAYER, LTD.

(57) ABSTRACT

A device for transporting workpieces includes a manufacturing execution system (MES), a driverless transport vehicle controllable indirectly or directly by the MES, a workpiece holder for receiving a workpiece, and a docking station for receiving the workpiece holder. The docking station is reachable by the driverless transport vehicle. The device further includes a position sensor connected indirectly or directly to the MES. The position sensor is configured for detecting a position of the workpiece holder at the docking station.

14 Claims, 3 Drawing Sheets

(56) References Cited

U.S. PATENT DOCUMENTS

| | | | | |
|---|---|---|---|---|
| 2013/0184849 | A1* | 7/2013 | Chan | A47J 37/0713 901/1 |
| 2017/0158431 | A1* | 6/2017 | Hamilton | B65G 1/1373 |
| 2019/0064845 | A1* | 2/2019 | Pardasani | G05B 19/41895 |
| 2019/0127000 | A1 | 5/2019 | Eberl | |
| 2019/0244309 | A1 | 8/2019 | Ottnad et al. | |
| 2020/0231386 | A1 | 7/2020 | Shiu et al. | |
| 2021/0011479 | A1* | 1/2021 | Levasseur | G05D 1/021 |
| 2021/0373539 | A1 | 12/2021 | Tiedemann et al. | |
| 2022/0187847 | A1* | 6/2022 | Cella | G05B 19/41885 |

FOREIGN PATENT DOCUMENTS

| | | | |
|---|---|---|---|
| DE | 102012110854 | A1 | 5/2014 |
| DE | 202016102149 | U1 | 7/2017 |
| DE | 102018203880 | A1 | 9/2019 |
| DE | 102019214088 | A1 | 3/2021 |
| EP | 0654721 | A1 | 5/1995 |
| WO | 9902434 | A2 | 1/1999 |

* cited by examiner 20
40a 20
40a
40b 20
40a
40b
40c

DOCKING STATION FOR A WORKPIECE HOLDER IN A DRIVERLESS TRANSPORT SYSTEM

CROSS-REFERENCE TO PRIOR APPLICATION

This application is a continuation of International Application No. PCT/EP2022/056605 (WO 2022/194813 A1), filed on Mar. 15, 2022, and claims benefit to German Patent Application No. DE 10 2021 202 682.6, filed on Mar. 19, 2021. The aforementioned applications are hereby incorporated by reference herein.

FIELD

Embodiments of the present invention relate to a device for transporting workpieces with a workpiece holder, and to a method for checking in a workpiece holder.

BACKGROUND

In sheet-metalworking, it is known for a manufacturing execution system (MES) to be used for controlling manufacturing. US 2019/0244309 A1 describes a MES having a tracking system for tracking workpieces in sheet-metalworking. The tracking system comprises mobile units which can be disposed on a workpiece holder.

EP 0 654 721 A1 discloses a manufacturing system with transfer stations for loading and unloading workpiece holders.

In the known solutions, the use of driverless (autonomous) transport vehicles is problematic. In order to move a workpiece holder by a driverless transport vehicle, the position of the workpiece holder as well as the position of the transport vehicle have to be determined very precisely. Otherwise, collisions may arise, and/or an automated approach of the transport vehicle to the workpiece holder is impossible. Such issues often arise in practice when human workers (users) do not provide workpiece holders exactly at the parked positions provided for this purpose.

SUMMARY

Embodiments of the present invention provide device for transporting workpieces. The device includes a manufacturing execution system (MES), a driverless transport vehicle controllable indirectly or directly by the MES, a workpiece holder for receiving a workpiece, and a docking station for receiving the workpiece holder. The docking station is reachable by the driverless transport vehicle. The device further includes a position sensor connected indirectly or directly to the MES. The position sensor is configured for detecting a position of the workpiece holder at the docking station.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
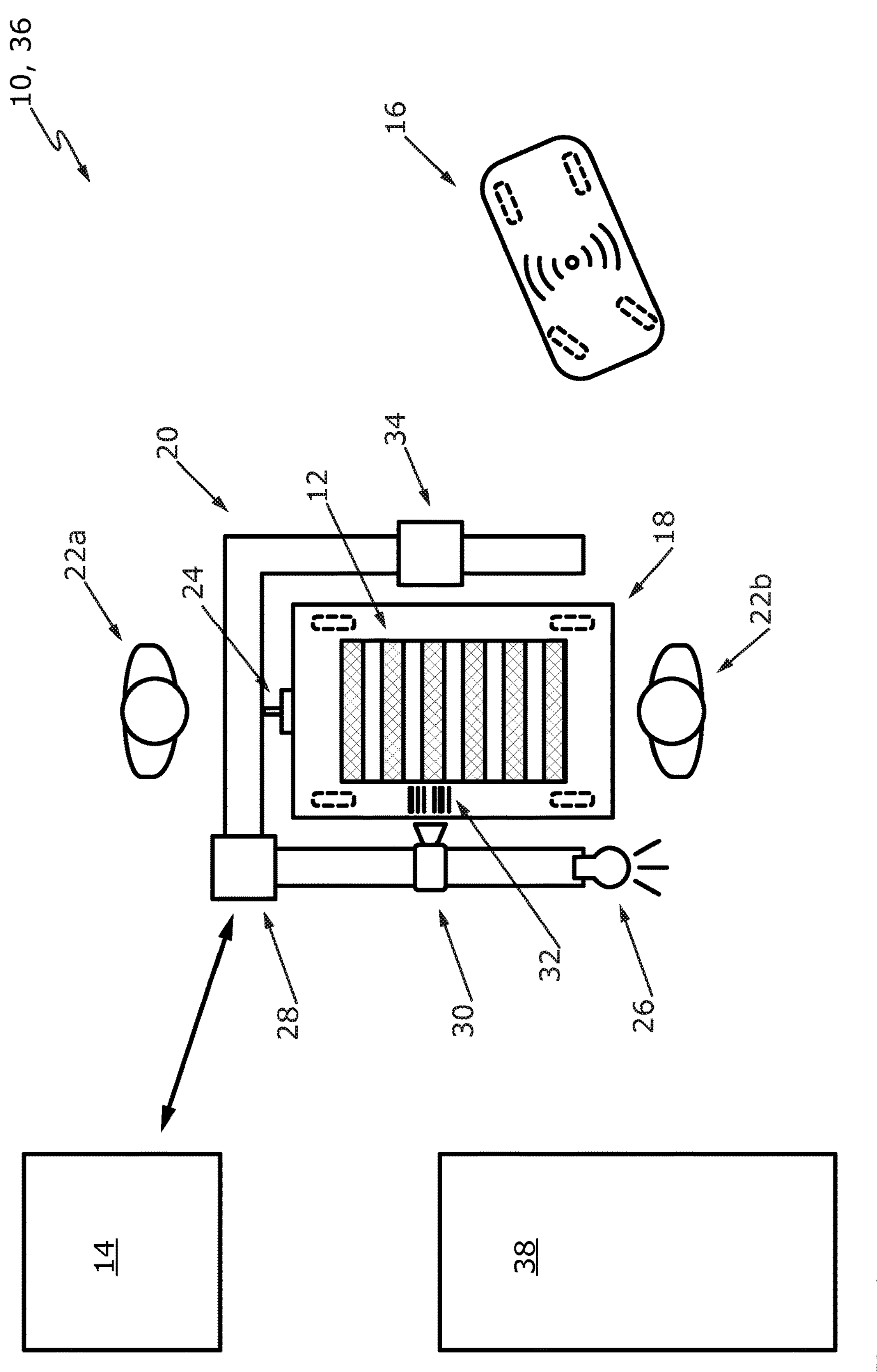
FIG. 1 shows a schematic plan view from above of a device having a docking station according to some embodiments.

Embodiments of the invention provide a device and a method which significantly facilitate manufacturing control by a MES.

Embodiments of the present invention provide a device for transporting workpieces. The device has a MES, a driverless vehicle controllable by the MES, a workpiece holder, and a docking station that is able to be approached by the driverless transport vehicle. The docking station is configured for receiving the workpiece holder. Said docking station has a position sensor in order to determine the position of the workpiece holder at the docking station.

The docking station enables a workstation to be supplied with material, or machined material to be retrieved from the workstation. The docking station herein can function as a buffer space.

The position sensor ensures that the workpiece holder is situated in the (correct) parked position so that the driverless transport vehicle can reach the workpiece holder and pick up the latter without a collision.

The position sensor can moreover be configured to establish the absence of a workpiece holder from the docking station, so that a delivery of workpiece holders can also be controlled by the MES in a targeted and reliable manner in terms of the process.

The MES can at least in part be of a stationary configuration and/or at least in part be stored in a cloud.

The workpiece holder can have a mobile truck.

The workpiece holder can have a pallet. The pallet is preferably configured in the form of a Euro pallet (1200 mm×800 mm), or in the form of a GMA pallet (1219 mm×1016 mm (40"×48")). The docking station is preferably adaptable so as to receive pallets of different sizes, in particular to receive a Euro pallet or a GMA pallet.

In a further preferred embodiment of the invention, the position sensor is disposed or configured on the docking station. As a result of the position sensor being integrated in the docking station, the latter is easy to handle and move.

The position sensor can be configured in the form of a switch, the switch being activatable by the workpiece holder only when the workpiece holder is situated in a parked position at which said workpiece holder is accessible to the driverless transport vehicle. The switch is preferably configured in the form of a detent for the workpiece holder.

The docking station can have a signaling installation which as a function of the detected position of the workpiece holder emits a signal. The signaling installation can emit a visual and/or acoustic signal. The signaling installation can be configured to emit a signal which indicates the parked position of the workpiece holder at the docking station, and/or a faulty stopped position of the workpiece holder at the docking station. The signaling installation preferably has a light for displaying the signal.

The docking station can be configured to signal a status of a transport order of a driverless transport vehicle, and/or a correct booking of a workpiece holder in the MES, so as to provide feedback to workers.

The docking station can be connected to the MES by wires. Alternatively or additionally thereto, the docking station can be wirelessly connected to the MES. The docking station is preferably connected to the MES by a WLAN gateway. As a result, the docking station can be set up and repositioned in a simple manner. The WLAN gateway is preferably configured to communicate in the open platform communications united architecture (OPC-UA) format.

Furthermore preferably, the docking station has all of the sensors and network components required for its operation, so that no hard-wired network structure (plug sockets, etc.) have to be installed and wired throughout a factory shed.

Furthermore preferably, the docking station has an identification sensor in order to be able to identify the workpiece holder. The identification sensor can be configured in the form of an optical sensor, a code scanner and/or in the form of an RFID scanner. The identification sensor can be connected indirectly or directly to the MES, in particular by means of the WLAN gateway. The identification sensor and/or the position sensor can be configured to trigger in an automated manner the movement of the driverless transport vehicle, in particular by means of the MES.

Alternatively or additionally thereto, the docking station can have a height sensor in order to detect the height of the workpiece holder. The overall height of the workpiece holder, in particular including the workpiece load, can be able to be established by the height sensor. It can be avoided as a result that the driverless transport vehicle drives the workpiece holder to unsuitable locations, for example into excessively low shelves. The docking station can be configured such that the workpiece holder at the docking station is accessible by workers from two mutually opposite sides. Alternatively or additionally thereto, the device can have a pallet shelf below which the docking station is disposed, so that the available space is optimally utilized.

The docking station is preferably configured in such a manner for the driverless transport vehicle that the workpiece holder is able to be handled from two mutually opposite sides. The enables a flexible disposal of the docking station in the factory layout, in order to allow the worker ready access to the workpiece holder also in different workstation constellations.

In a further preferred design embodiment of the docking station, the latter has a plurality of receptacle spaces, each receptacle space having one position sensor described herein.

The docking station can be of a modular configuration. Each module herein can have one receptacle space, each receptacle space having one position sensor, and preferably one signaling installation and/or one identification sensor. The docking station preferably has a WLAN gateway which is conjointly utilized by all modules. The modules can in each case have one central part which is in particular length-adjustable and defines the width of the respective receptacle space. The individual modules can be configured to be connectable without tools, in particular to be plugged into one another.

The device according to embodiments of the invention is preferably able to be used in a metalworking, in particular in a sheet-metalworking, facility.

Embodiments of the invention also provide a method, wherein the method is carried out in particular with a device described herein. The method comprises the following method steps:

A) dropping off a workpiece holder in a parked position at a docking station;

B) detecting the parked position by a position sensor;

C) communicating the information that the workpiece holder is situated in the parked position to a MES, and checking in the workpiece holder in the MES.

The device can have a machine tool and the workpiece holder can be moved to the machine tool or away from the machine tool, whereby the workpiece holder is temporarily stored in the docking station. By virtue of the temporary "intermediate storage" of the workpiece holder, the docking station serves as a buffer space for the workpiece holder. Additionally thereto, the workpiece holder can be temporarily stored on a further space which is situated in particular between the machine tool and the docking station.

The workpiece holder can be identified by an identification sensor. The identity of the workpiece holder can be transmitted to the MES. The check-in in the MES can be initiated by the position sensor and/or the identification sensor.

The communication between the docking station and the MES preferably takes place wirelessly, in particular by WLAN.

The method can furthermore comprise the following method step:

D) picking up the workpiece holder by a driverless transport vehicle controlled by the MES.

The method step D) herein can be initiated by checking in the workpiece holder into the MES.

In a further preferred embodiment of the invention, a plausibility check in terms of the loading of the workpiece holder can be carried out in the MES. By means of the plausibility check it can be established in particular whether an empty workpiece holder or a workpiece holder with a specific order, has arrived at a specific storage location. The plausibility check can take into account that workpiece holders are usually placed onto a mobile truck or retrieved therefrom only at specific supply points or discharge points.

A height verification of the workpiece holder is preferably carried out by a height sensor.

Alternatively or additionally thereto, the MES as a function of the checked-in workpiece holders can rebook workpieces stored on the workpiece holders and/or upload a machining program on a machine tool of a workstation.

The method according to embodiments of the invention is preferably used in a metalworking, in particular a sheet-metalworking, facility.

Further advantages of the embodiments of the invention are derived from the description and the drawing. The features mentioned above and discussed hereunder can also be used individually or in multiples in arbitrary combinations. The embodiments shown and described should not be understood as an exhaustive list, but rather are of an exemplary character for outlining the embodiments of the invention.

FIG. 1 shows a device 10 for transporting workpieces of which one workpiece 12 is provided with a reference sign in FIG. 1. The device 10 comprises a manufacturing execution system (MES) 14 for controlling a driverless transport vehicle 16. The driverless transport vehicle 16 is configured to move a workpiece holder 18. The workpiece holder 18 for receiving the workpiece 12 is presently configured in the form of a pallet.

Picking up and dropping off (parking) the workpiece holder 18 by the driverless transport vehicle 16 is performed in a docking station 20. The docking station 20 and the workpiece holder 18 are configured to be so low that the workpiece holder 18 is accessible by workers 22*a*, 22*b* from at least two sides.

The docking station 20 has a position sensor 24, here in the form of a feeler, in order to detect the correct parked position of the workpiece holder 18 in the docking station. The correct parked position at the docking station 20 can be indicated by a signaling installation 26.

The docking station 20 is connected to the MES 14 in particular by a WLAN gateway 28, in order to check in the parked workpiece holder 18 in the MES 14.

Furthermore, the MES 14, in particular by the WLAN gateway 28, can transmit the identity of the workpiece holder 18. The identity herein can be ascertained by an identification sensor 30. The identification sensor 30 is preferably configured in the form of a camera, in order to detect a code 32 on the workpiece holder 18. Alternatively or additionally thereto, the identification sensor 30 can be configured in the form of an RFID scanner.

Alternatively or additionally thereto, the docking station can have a height sensor 34, in order to detect the height of the workpiece holder 18 and/or of the workpiece 12. The detected height can be transmitted to the MES 14, in particular by the WLAN gateway 28.

In one preferred embodiment, a method 36 is carried out, in particular with the device 10, the method 36 comprising the following method steps:

A) dropping off the workpiece holder 18 at the docking station 20;

B) detecting the parked position of the workpiece holder 18 at the docking station 20 by the position sensor 24;

C) transmitting that the workpiece holder 18 is situated in the parked position to the MES 14, and checking in the workpiece holder 18 in the MES 14; and in particular D) picking up the workpiece holder 18 by the driverless transport vehicle 16 controlled by the MES 14.

The MES 14 as a function of the checked-in workpiece holders 18 can rebook workpieces 12 stored on the workpiece holders 18 and/or upload a machining program on a machine tool 38.

Figure 2:
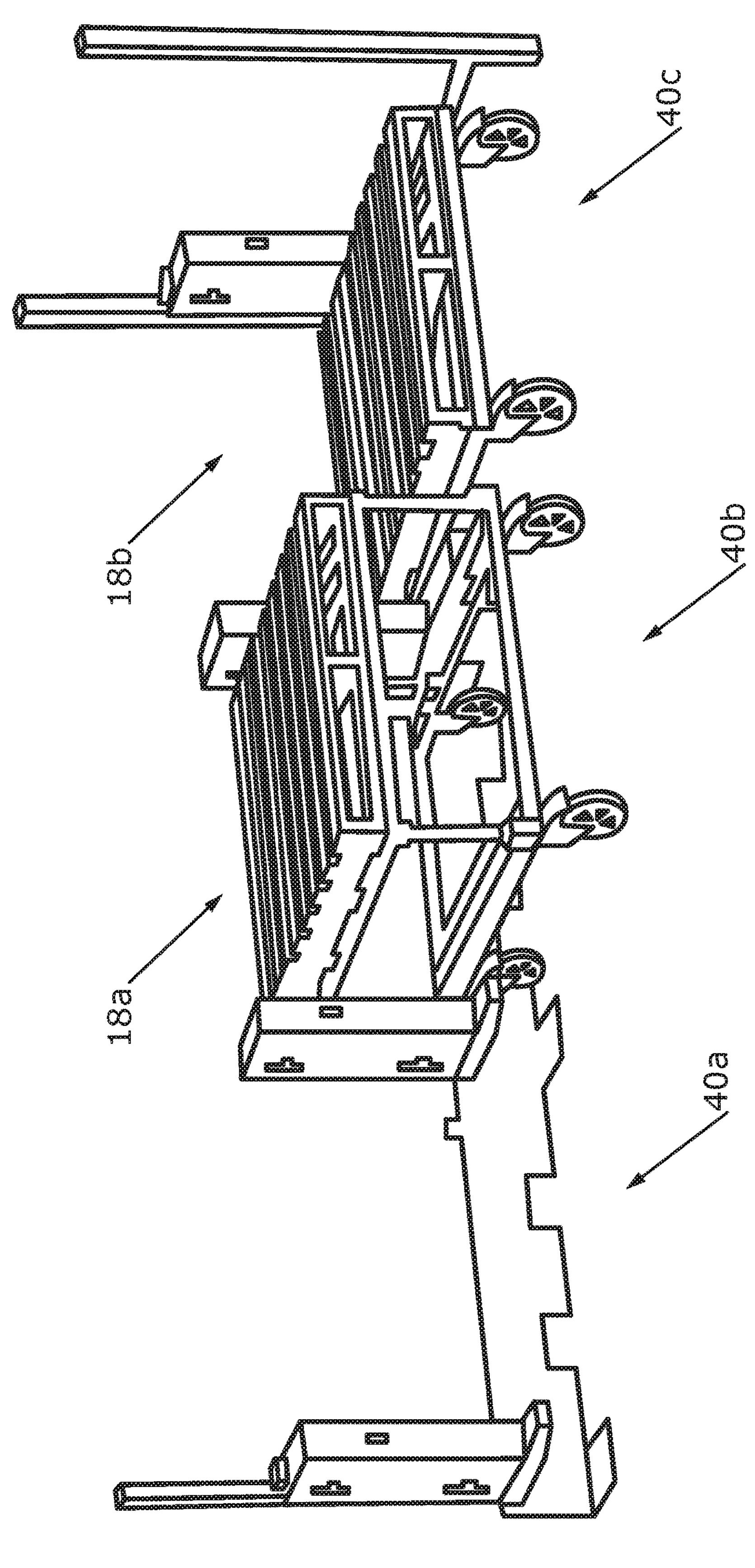
FIG. 2 shows a perspective view of a docking station according to some embodiments.

FIG. 2 shows a perspective view of a device 10 having a plurality of receptacle spaces 40*a*, 40*b*, 40*c* for in each case one workpiece holder 18*a*, 18*b*.

Figures 3A, 3B, 3C:
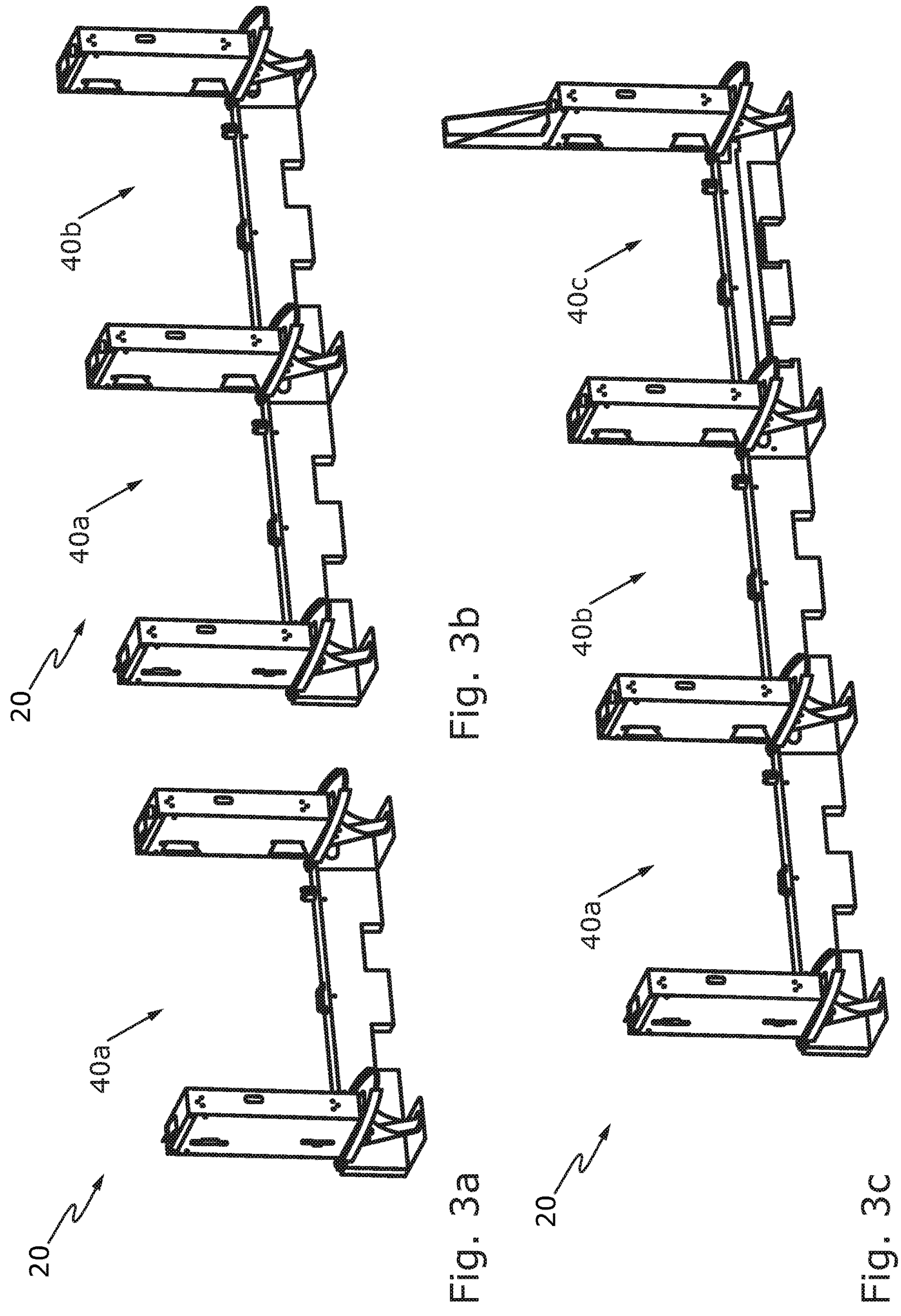
FIG. 3*a* shows a perspective view of a docking station for a workpiece holder according to some embodiments.
FIG. 3*b* shows a perspective view of a docking station having receptacle spaces for two workpiece holders that can be received next to one another according to some embodiments.
FIG. 3*c* shows a perspective view of a docking station having receptacle spaces for three workpiece holders that can be received next to one another according to some embodiments.

FIGS. 3*a-c* show in each case a docking station 20. It can be seen from FIGS. 3*a-c* that the docking station 20 is preferably of a modular configuration, having extendable receptacle spaces 40*a-c*.

When all figures of the drawing are viewed collectively, embodiments of the invention relate to a device 10 and to a method 36 for parking workpiece holders 18, 18*b, b* in a docking station 20. The docking station 20 herein has at least one receptacle space 40*a-c* for the workpiece holders 18, 18*a, b*. The docking station 20 is preferably extendable in a modular manner by at least one further receptacle space 40*a-c*. The docking station 20 has a position sensor 24 which is connected to a manufacturing execution system (MES) 14 and is configured to report to the MES 14 the correct parked position of the workpiece holder 18, 18*a, b* in the receptacle space 40*a-c*. The MES 14 can be configured to effect and control a movement of a driverless transport vehicle 16 based on this booking.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Device
12 Workpiece
14 Manufacturing execution system (MES)
16 Driverless transport vehicle
18, 18*a,b* Workpiece holder
20 Docking station
22*a,b* Worker
24 Position sensor
26 Signaling installation
28 WLAN gateway
30 Identification sensor
32 Code
34 Height sensor
36 Method
38 Machine tool
40*a-c* Receptacle space

The invention claimed is:

1. A device for transporting workpieces, the device comprising:

a manufacturing execution system (MES);

a driverless transport vehicle controllable indirectly or directly by the MES;

a workpiece holder for receiving a workpiece;

a docking station for receiving the workpiece holder, the docking station being reachable by the driverless transport vehicle; and a position sensor connected indirectly or directly to the MES, the position sensor being configured for detecting a position of the workpiece holder at the docking station, wherein the position sensor is configured as a switch, the switch being activatable by the workpiece holder only when the workpiece holder is situated in a parked position at the docking station at which the workpiece holder is accessible to the driverless transport vehicle.

2. The device as claimed in claim 1, wherein the position sensor is disposed or configured on the docking station.

3. The device as claimed in claim 2, wherein the docking station includes a plurality of receptacle spaces for the workpiece holder, each receptacle space having a respective position sensor for detecting the position of the workpiece holder.

4. The device as claimed in claim 3, wherein the docking station has a modular configuration and comprises a plurality of modules, each module having a respective receptacle space.

5. The device as claimed in claim 1, wherein the docking station comprises a wireless local area network (WLAN) gateway for communicating with the MES.

6. The device as claimed in claim 1, wherein the docking station comprises an identification sensor configured to identify the workpiece holder.

7. The device as claimed in claim 1, wherein the docking station comprises a height sensor configured to detect a height of the workpiece holder.

8. A method for checking in a workpiece holder of a device for receiving and transporting workpieces, the device comprising:
  - a manufacturing execution system (MES),
  - a driverless transport vehicle controllable indirectly or directly by the MES,
  - a docking station for receiving the workpiece holder, the docking station being reachable by the driverless transport vehicle, and
  - a position sensor connected indirectly or directly to the MES, the position sensor being configured for detecting a position of the workpiece holder at the docking station,
  - wherein the position sensor is configured as a switch, the switch being activatable by the workpiece holder only when the workpiece holder is situated in a parked position at the docking station at which the workpiece holder is accessible to the driverless transport vehicle, the method comprising:
  - dropping off the workpiece holder in the parked position at the docking station;
  - detecting the parked position of the workpiece holder at the docking station using the position sensor;
  - transmitting that the workpiece holder is situated in the parked position to the manufacturing execution system; and
  - checking in the workpiece holder in the MES.

9. The method as claimed in claim 8, further comprising identifying an identity of the workpiece holder using an identification sensor, and transmitting the identity of the workpiece holder to the MES.

10. The method as claimed in claim 8, wherein the docking station communicates with the MES via a wireless local area network (WLAN).

11. The method as claimed in claim 8, further comprising:
  - picking up the workpiece holder using a driverless transport vehicle controlled by the MES.

12. The method as claimed in claim 11, wherein the pick-up of the workpiece holder is initiated in an automated manner by the check-in of the workpiece holder in the MES.

13. The method as claimed in claim 8, further comprising performing a plausibility check in the MES in terms of loading of the workpiece holder.

14. The method as claimed in claim 8, wherein the MES as a function of the checked-in of the workpiece holders rebooks workpieces stored on the workpiece holders and/or uploads a machining program on a machine tool of a workstation.

* * * * *